United States Patent [19]
Newell et al.

[11] Patent Number: 4,508,916
[45] Date of Patent: Apr. 2, 1985

[54] CURABLE SUBSTITUTED URETHANE ACRYLATES

[75] Inventors: Richard G. Newell; Stephen F. Wolf, both of St. Paul, Minn.

[73] Assignee: Minnesota Mining and Manufacturing Company, St. Paul, Minn.

[21] Appl. No.: 496,471

[22] Filed: May 20, 1983

Related U.S. Application Data

[63] Continuation of Ser. No. 255,739, Apr. 20, 1981, abandoned, which is a continuation-in-part of Ser. No. 028,966, Apr. 11, 1979, abandoned.

[51] Int. Cl.³ .................. C07F 7/18; C07C 125/073; C07C 125/077
[52] U.S. Cl. .................................. 556/420; 560/26; 560/115; 560/158; 526/240; 526/247; 204/159.13; 204/159.22
[58] Field of Search .................. 560/26, 115, 158; 556/420

[56] References Cited

U.S. PATENT DOCUMENTS 2,959,611 11/1960 Nelson ............................. 560/158
3,948,887 4/1976 Hager ............................... 560/158
4,059,613 11/1977 Nakamura ........................ 560/26
4,107,229 8/1978 Tideswell ......................... 260/841
4,321,404 3/1982 Williams .......................... 560/160

FOREIGN PATENT DOCUMENTS 3013826 10/1980 Fed. Rep. of Germany ...... 560/115

Primary Examiner—Michael L. Shippen
Attorney, Agent, or Firm—Lorraine R. Sherman; Donald M. Sell; James A. Smith

[57] ABSTRACT

A class of substituted urethane acrylates and methacrylates having an aliphatic backbone is provided, the members of the class having at least one ether or polyether group with at least one pendent fluorinated organic group attached thereto. The novel compositions may be radiation polymerized, e.g., by electron beam, actinic light or heat, to a light transmissive material which is well suited to optical application, such as coupling optical fibers and light emitting diodes so as to transmit light therebetween.

13 Claims, No Drawings

CURABLE SUBSTITUTED URETHANE ACRYLATES

This is a continuing application of U.S. Ser. No. 255,739, filed Apr. 20, 1981, now abandoned, which is a continuation-in-part of application U.S. Ser. No. 028,966, filed Apr. 11, 1979, now abandoned.

TECHNICAL FIELD

The present invention relates to radiation curable urethane acrylates, the radiation being electron beam, actinic light, or heat. In another aspect, this invention relates to a class of substituted urethane acrylates and methacrylates, the members of the class having at least one ether or polyether group with at least one pendent fluorinated organic group attached thereto, and to the radiation cured materials produced therefrom. The curable composition is useful as an adhesive or in preparing protective coatings.

BACKGROUND ART

Polyurethane acrylates having a phenolic-type (novolac) backbone have been disclosed in U.S. Pat. No. 4,107,229. Fluorine-containing dicarbamate esters, in which the perfluoro alkyl group is not a pendent group, are disclosed in U.S. Pat. No. 4,059,613.

SUMMARY OF THE INVENTION

In one aspect, the present invention provides ether or polyether substituted urethane acrylates having pendent fluorinated organic substituents. In a further aspect, the present invention provides the cured product of radiation curable fluorinated organic group substituted ether or polyether containing urethane acrylates and methacrylates (hereinafter sometimes referred to as substituted urethane acrylates in the interest of brevity).

The substituted urethane acrylates of the present invention are curable (i.e., polymerizable) in the presence of catalysts or initiators which liberate or generate free-radicals under the influence of radiation such as actinic light or infrared radiation (heat). Free radicals can be generated in the system by the thermal or photo decomposition of known free radical initiators such as peroxides, benzoin ethers, and alpha-diketones. Alternatively, the present materials have been found to be curable by the means of electron beam irradiation even in the complete absence of an initiator.

The advantages of radiation curable (especially actinic light curable) polymers, such as providing the ability to precisely control the time and extent of cure, increased shelf life, and the utilization of undiluted (i.e., 100%) solids, has motivated considerable research effort toward the development of these compositions. The present invention is a novel radiation curable composition that is particularly useful for specialty applications, such as in joining electro-optical components. The cured compositions, having an optical transmission of greater than 95% and a low refractive index, are well suited as adhesives in applications where optical transmissivity is required. This utility is more completely described in assignee's copending application Ser. No. 249,848 entitled "Coupling of Light Conductors and Light-Emitting Diodes" filed in the name of James R. Onstott and Stephen F. Wolf on Apr. 1, 1981 and now abandoned. The cured materials of the invention can also be utilized as tack-free protective coatings.

DETAILED DESCRIPTION OF THE INVENTION

In accordance with the invention, there is provided a class of substituted urethane acrylates and methacrylates having an aliphatic backbone, the members of the class having in the backbone at least one ether or polyether group with at least one pendent fluorinated organic group attached thereto, said urethane acrylate having the formulae:

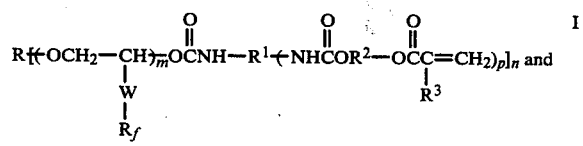

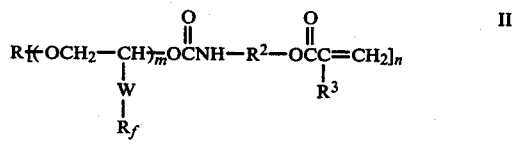

wherein R is a monomeric or polymeric organic radical having a valence of n selected from monomeric radicals of the group consisting of alkyl, cycloalkyl, and aralkyl radicals having 1 to 18 carbon atoms and polymeric radicals having the formulae:

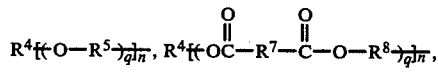

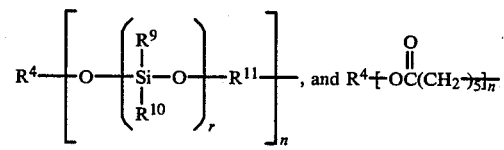

wherein
$R^4$ is an aliphatic radical having 1 to 18 carbon atoms, or a cycloaliphatic radical having 5 to 18 carbon atoms and a valence of r;
$R^5$ is alkylene having 2 to 4 carbon atoms;
$R^7$ is alkylene having 2 to 12 carbon atoms or cycloalkylene having 5 to 12 carbon atoms or arylene having 6 to 15 carbon atoms;
r is a number having a value from 1 to 26;
$R^8$ is a divalent aliphatic radical having 2 to 12 carbon atoms or a cycloaliphatic divalent radical having 5 to 18 carbon atoms;
$R^9$ and $R^{10}$ are independently methyl, ethyl or phenyl;
$R^{11}$ is alkylene having 2 to 12 carbon atoms or cycloalkylene having 5 to 12 carbon atoms; and
q is a number sufficient to provide a molecular weight of the polymeric radical of less than 2000 and an equivalent weight per valence of less than 1000;
n is an integer from 1 to 6;
W is a connecting group selected from a single bond, $-CH_2O-$, $-CH_2-O-CH_2-$, and

$R^1$ is an organic di- or trivalent radical selected from aliphatic radicals having 2 to 18 carbon atoms, cycloaliphatic radicals having 5 to 18 carbon atoms, and aromatic radicals having 6 to 18 carbon atoms;

$R^2$ is a divalent aliphatic group having 2 to 6 carbon atoms;

$R^3$ is hydrogen or methyl;

m is a number having a value from 1 to 20;

p is one or two; and $R_f$ is a monovalent fluorinated organic radical having 1 to 18 carbon atoms and 35 to 85 weight percent of fluorine.

The basic novel polymer is an aliphatic hydroxylated mono or polyether which is endcapped with at least one acrylic or methacrylic group through an aliphatic or aromatic urethane group. The backbone of the novel polymer, exclusive of its one or more end groups, is entirely aliphatic or cycloaliphatic.

"Aliphatic" means a saturated group of carbon atoms optionally containing 1 or 2 non-vicinal catenary oxygen atoms. "Catenary" means in the polymer chain, as for example, an ether linkage.

The urethane acrylates of the invention are generally prepared by procedures well known in the art. One synthetic route is as follows:

I. Preparation of a fluorinated organic group substituted ether alcohol or polyetheralcohol.

A fluorinated organic radical substituted (the substitution corresponding to —W—$R_f$ in the final product) ether alcohol or polyetheralcohol is prepared by ring opening addition polymerization of a fluorinated organic group substituted epoxide with a hydroxyl containing compound (containing n hydroxyl groups) initiator. This reaction may be written thus:

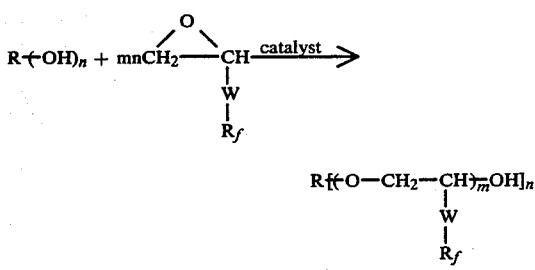

In equation III, $R_f$ is a pendent, monovalent, fluorinated aliphatic, aryl, or alkaryl radical. "Pendent" as the term is used herein means not of the backbone carbon chain, i.e., non-catenary. By "fluorinated" it is meant that generally 35 to 85 weight percent, preferably 50-77 weight percent, of the fluorinated organic group is fluorine, with at least 75 percent of the non-catenary carbon valence bonds being attached to fluorine atoms. The weight percent of fluorine in the preferably saturated pendent fluorinated organic group is found by dividing the total atomic weight of the radical into the total atomic weight of the fluorine atom present in the radicals (e.g., —$CF_3$ is 82.6 weight percent fluorine). Where $R_f$ contains a plurality of carbon atoms in a skeletal chain, such chain may be straight, branched or cyclic, but preferably is straight. The skeletal chain of carbon atoms can be interrupted by divalent oxygen or trivalent nitrogen heteroatoms, each of which is bonded only to carbon atoms, but where such heteroatoms are present, it is preferably that the skeletal chain contain not more than one said heteroatom for every two carbon atoms. An occasional carbon-bonded hydrogen atom, bromine atom, or chlorine atom may be present. Where such atoms are present, they are preferably present to the extent of not more than one such atom for every two carbon atoms in the chain. Thus, the non-skeletal valence bonds are preferably carbon-to-fluorine bonds, that is, $R_f$ is preferably perfluorinated. The total number of carbon atoms of $R_f$ can vary and can be, for example 1 to 18, preferably 1 to 12. Where $R_f$ is or contains a cyclic structure, such structure preferably has 5 or 6 ring member atoms, 1 or 2 of which can be heteroatoms, e.g., oxygen and/or nitrogen. Where $R_f$ is aryl, it has 1 or 2 rings. Where $R_f$ is an aromatic structure, the aromatic structure may be substituted with lower alkyl radicals (i.e., alkyl radicals having 1–4 carbon atoms). Examples of such aryl radicals include perfluorophenyl, 4-trifluoromethylphenyl, and perfluoronaphthyl. $R_f$ is also preferably free of ethylenic or other carbon-to-carbon unsaturation, that is, it is a saturated aliphatic or heterocyclic radical. Examples of useful $R_f$ radicals are fluorinated alkyl, e.g., —$CF_3$, —$C_8F_{17}$ and alkoxyalkyl, e.g., $CF_3OCF_2$— and $(CF_3)_2CFO$, said radicals being preferably perfluorinated straight-chain alkyl radicals, $C_nF_{2n+1}$, where n is 1 to 12.

In the above formula, W is a single bond or a polyvalent connecting moiety having a valence of at least 2 and is preferably selected from the group consisting of a single bond, —$CH_2O$—, —$CH_2$—O—$CH_2$—, or

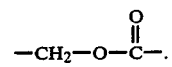

The pendent group —W—$R_f$ is herein sometimes referred to as "the pendent fluorinated organic substituent".

In equation III above, catalysts may be employed such as Lewis acids, optionally modified with organotin compounds. Generally, the reaction may be run without solvent at a temperature of about 25° C. to 150° C. It is important to note at this juncture that the pendent substituent of the epoxide (—W—$R_f$ in I) becomes the pendent substituent of the novel substituted urethane acrylates of the invention. Hence, in this preparative route, the pendent substituent of the end product is determined by the materials reacted in the first step.

II. Preparation of substituted urethane acrylates of the invention.

The fluorinated organic group containing ether or polyether alcohol is endcapped with an acrylic or methacrylic group by either of two routes: (a) reaction of the ether alcohol with a polyisocyanate followed by reaction with a hydroxyalkyl acrylate or methacrylate, or (b) reaction of the ether alcohol with an isocyanatoacrylate or methacrylate according to the equations:

Route (a)

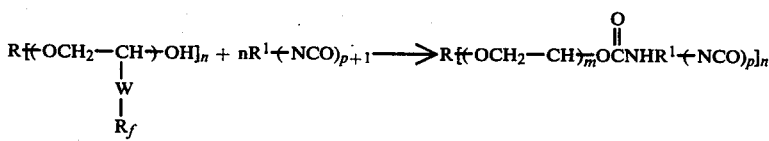

etheralcohol + polyisocyanate ⟶ isocyanate endcapped product and

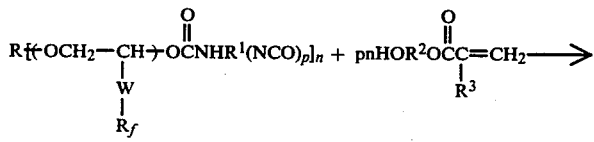

isocyanate endcapped product + hydroxyalkylacrylate ⟶

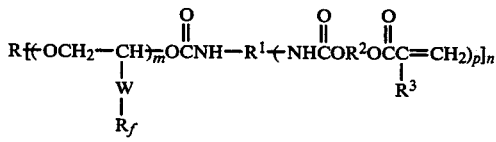

urethane acrylate

Route (b)

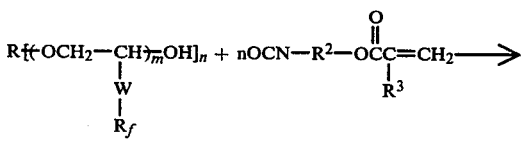

etheralcohol + isocyanatoacrylate ⟶

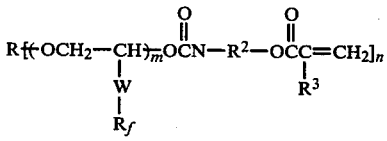

urethane acrylate

Less preferably the isocyanatoacrylate may first be prepared by reactions of a polyisocyanate with a hydroxyalkyl acrylate and this product caused to react with the ether alcohol to produce the urethane acrylate of the invention according to the equations:

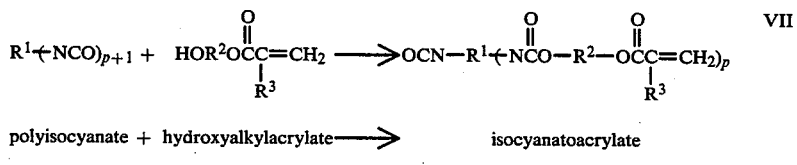

polyisocyanate + hydroxyalkylacrylate ⟶ isocyanatoacrylate and

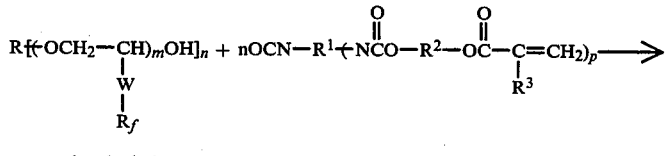

etheralcohol + isocyanatoacrylate

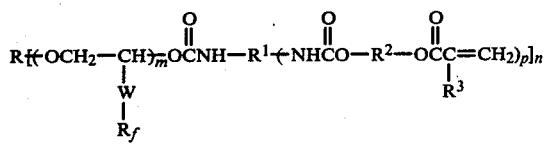

urethane acrylate

In the above equations all symbols are as defined above.

It is also contemplated and often desirable to modify the fluorinated organic group substituted ether alcohols and polyetheralcohols of equation III above, by copolymerizing the fluorinated organic group-substituted epoxide with one or more oxacycloalkanes which may or may not have fluorine substituents.

Oxacycloalkanes (cyclic ethers) herein comprise cycloaliphatic compounds having at least one oxygen heteroatom in the aliphatic ring. Oxacycloalkanes polymerize by ring opening to polyethers. Particularly useful oxacycloalkanes are the 2-, 3- and 4-carbon atom (which in conjunction with an oxygen heteroatom form 3-, 4- and 5-member rings) species known as oxiranes, oxetanes and oxolanes. It has been found that the fluorinated organic group-substituted ether alcohols or polyether alcohols (equation I) can be modified with up to about 80% by weight oxacycloalkanes which contain no fluorine.

Modification of the substituted urethane acrylates of the present invention by selectively incorporating oxacycloalkanes therein provides a method to control the optical characteristics of the finished polymer. For example, decreasing the fluorine content of the polymer by increasing the amount of oxacycloalkane in the polyether chain, generally increases its refractive index.

Suitable hydroxyl-containing materials which can be used as initiators in step I preferably contain 1 to 6 hydroxyl groups and include water and monomeric or polymeric aliphatic alcohols having 1 to 18 or more carbon atoms. Examples of such aliphatic alcohols include methanol, ethanol, 2-chloroethanol, isopropanol, octanol-1, dodecanol, cyclohexanol, ethyleneglycol, propyleneglycol, 1,3-butanediol, 3,4-dibromo-1,4-butanediol, 1,4-butanediol, neopentylglycol, 1,6-hexanediol, 1,4-cyclohexanediol, 1,4-cyclohexanedimethanol, 2-(2-hydroxyethoxy)ethanol, 2-[2-(hydroxyethoxy)ethoxy]-ethanol, 2-[[2-[2-(hydroxyethoxy)ethoxy]ethoxy]]ethanol, 3-(3-hydroxypropoxy)propanol, glycerol, trimethylolpropane, pentaerythritol, dipentaerythritol, sorbitol, 1,1,4,4-tetrahydroperfluorotetramethyleneglycol, 1,1,5,5-tetrahydroperfluoropentamethyleneglycol, and 1,1,6,6-tetrahydroperfluorohexamethyleneglycol and the monomeric alcohols described in U.S. Pat. No. 3,318,960. Preferred hydroxyl-containing materials for use as initiators are the short chain aliphatic terminal diols containing 4 to 6 methylene groups such as 1,6-hexanediol and 1-4 butanediol.

Suitable polymeric aliphatic alcohols for use in the present invention generally contain only carbon, hydrogen and oxygen and have 1 to 6 hydroxyl groups. The hydroxyl groups may be primary or secondary and generally should be present to the extent of at least about one per 1500 units of molecular weight (i.e., a hydroxy equivalent weight of less than 1500 is preferred). Polymeric aliphatic alcohols having a hydroxyl equivalent weight of greater than about 1500 generally produce substituted urethane acrylates having a fluorine content which is too low to exhibit the advantageous properties of the present materials. Polymeric diols and triols having a molecular weight of less than about 2000 (corresponding to a hydroxyl equivalent weight of 670 and 1000 for triols and diols respectively) constitute a preferred class of polymeric aliphatic alcohols.

Other useful polymeric aliphatic alcohols include polyester polyols, such as the lactone polyesters polyols described in U.S. Pat. No. 3,169,945 (especially the polyesters terminated with two or more hydroxyl groups formed by reaction of epsilon-caprolactone and polyol), the hydroxyl-terminated polyester condensation polymers described in U.S. Pat. No. 3,641,199, the substantially linear, saturated, hydroxyl-terminated polyesters described in U.S. Pat. No. 3,457,326, the hydroxy-containing polyesters described in U.S. Pat. No. 3,931,117, and the hydroxy-terminated block polymers of polyethers and polyesters described in U.S. Pat. No. 3,960,572. Useful polyether block polymers include the hydroxy-terminated polyether condensation polymers described in U.S. Pat. No. 3,641,199, the substantially linear, saturated, hydroxy-terminated polyethers described in U.S. Pat. No. 3,457,326, the polyalkylene ether polyols described in U.S. Pat. Nos. 3,499,852, 3,697,485 and 3,711,444, and the polyetheylene glycol and polypropylene glycols described in U.S. Pat. No. 3,850,770. Useful polyolefin polyols include those described in U.S. Pat. No. 3,678,014 and the $\alpha,\omega$-diols from ethylene described in J. Polymer Science, Part A-1, Vol. 5, p. 2693 (1967). A particularly useful, commercially available class of caprolactone polyols which can be used are those sold under the Trademark "NIAX," such as PCP-0200, PCP-0210, PCP-0230 and PCP-0300 (e.g., see technical bulletin F42464 of Union Carbide Corp.).

Other useful hydroxyl-containing materials which can be utilized as initiators in equation III include polysiloxane polyols such as the hydroxy-terminated diorgano polysiloxanes described in U.S. Pat. Nos. 4,098,742 and 3,886,865, and the siloxanes having a reactive hydroxylfunctional group bonded to at least two of its silicon atoms, described in U.S. Pat. Nos. 3,577,264, 3,976,676 and 4,013,698.

Suitable epoxide-containing compounds having pendent fluorinated organic substituents (which become W-R$_f$ in the finished polymer) are the fluoroaliphatic glycidyl ether compounds including perfluoroalkyl glycidyl ethers such as perfluoroisopropyl glycidyl ether whose preparation is described in U.S. Pat. No. 3,361,685; the 1,1-dihydroperfluoroalkyl glycidyl ethers such as 1,1-dihydrotrifluoroethyl glycidyl ether, 1,1-dihydropentafluoropropyl glycidyl ether, 1,1-dihydroheptafluorobutyl glycidyl ether, 1,1-dihydropentadecafluorooctyl glycidyl ether, 1,1-dihydrohepadecafluorononyl glycidyl ether and others whose preparation is described in U.S. Pat. No. 3,591,547; and the glycidyl perfluoroalkanoates such as glycidyl perfluoroacetate, glycidyl perfluoropropionate, glycidyl perfluorobutyrate, and glycidyl perfluorooctoate which are prepared by the esterification reaction of glycidol and the corresponding perfluoroalkanoic acids and the glycidyl ethers of fluorinated phenols such as perfluorophenyl glycidyl ether and trifluoromethylphenyl glycidyl ether.

Examples of oxaheterocycles that can be copolymerized with the fluorinated organic group-substituted epoxides for preparing the fluorocarbon alcohols and polyols include ethylene oxide; alkylsubstituted ethylene oxides, e.g., propyleneoxide, epichlorohydrin, butyleneoxide; alkenyl-substituted ethylene oxides, e.g., butenyloxide; aryl-substituted ethylene oxides, e.g., styreneoxide, benzylethylene oxide; glycidyl ethers, e.g., methyl glycidyl ether, butyl glycidyl ether, phenyl glycidyl ether, 3-phenylpropyl glycidyl ether, cyclohexyl glycidyl ether; cycloalkyl oxides, e.g., cyclohexene oxide, cyclopentene oxide and limonene oxide; oxetanes, e.g., oxetane and 2,2-dimethyl oxetane; and the oxolanes, e.g., tetrahydrofuran. Other suitable copolymerizable epoxides and glycidyl ethers are disclosed in U.S. Pat. No. 3,417,035 among others.

The preferred catalysts for preparing the fluorinated organic group-containing alcohols (equation I, above) are the catalyst systems comprising: (1) a fluorinated acid selected from bis(fluorinated aliphatic sulfonyl)alkanes, fluorinated aliphatic sulfonic acids, and Lewis acid of the formula $H_aXF_{b+a}$ where X may be aluminum, boron, phosphorus, arsenic, tin, antimony and the like; b is the highest oxidation number of X and a is 0 or 1; and (2) a polyvalent tin compound as are taught in Assignee's copending application Ser. No. 906,744, entitled "Colorless Hydroxyl-terminated Poly(chloroalkylene ethers)", filed on May 17, 1978, now abandoned, in the name of Chung I. Young and Loren I. Barber, Jr., incorporated herein by reference. Many other catalysts are useful for preparing the fluorocarbon alcohols by cationic polymerization techniques. Useful Lewis acid catalysts are disclosed in U.S. Pat. Nos. 3,269,961; 3,850,856; 3,910,878; 3,910,879; and 3,980,579 among others. Useful aluminum alcoholate catalysts are disclosed in U.S. Pat. No. 3,318,960 and the use of diethyl zinc to polymerize glycidyl ethers is disclosed in U.S. Pat. No. 3,361,685.

The fluorine containing alcohols are prepared in accordance with Equation III by adding one to 20 mole equivalents of fluorine containing epoxy compound to one hydroxyl equivalent of hydroxyl-containing initiator compound. The temperature and time required for the reaction will vary depending on the particular reactants and amounts employed and on the nature and amount of catalyst used. Generally, temperatures from about 20° C. to 200° C. for periods up to 24 hours suffice for the reaction. The catalyst concentration for the preferred fluorinated acid/organo tin compound can be from about 0.1% to about 1% of the total weight of reactants. Generally, the higher the catalyst concentration, the lower the temperature and shorter the time required for the reaction. An inert organic solvent such as dichloromethane or chloroform may be employed to facilitate the reaction.

Polyisocyanates useful for preparing the urethane acrylates can be aliphatic, cycloaliphatic or aromatic. Exemplary diisocyanates are disclosed in U.S. Pat. Nos. 3,641,199; 3,700,643; 3,960,572 and others. Preferred polyisocyanates are the cycloaliphatic and aromatic diisocyanates of which isophorone diisocyanate and toluene diisocyanate (tolylene-2,4-diisocyanate) are the most preferred. The polyisocyanate is used in a ratio of 0.8 to 1.2 moles of isocyanate per hydroxyl equivalent of the ether alcohol in accordance with techniques well known in the art.

An exemplary list of hydroxyalkylacrylates useful for preparing the substituted urethane acrylates is disclosed in U.S. Pat. No. 3,577,262. Other desirable compounds include hydroxyalkylpolyacrylates such as trimetholylpropanediacrylate and pentaerythritoltriacrylate.

The reaction of the fluorocarbon alcohol, diisocyanate, and hydroxyalkylacrylate to form the substituted urethane acrylate in accordance with Equations IV and V or VII and VIII is performed in sequential steps at temperatures from about 20° C. to 100° C. for about 10 minutes to several hours or more, the conditions being sufficient to bring about the reaction. Preferably, a tin catalyst such as diphenyl dibutyl tin dilaurate is used to promote the reaction. Other suitable catalysts include compounds containing tertiary amino groups, and titanium compounds. Generally, the catalyst is included to the extent of about 0.01 to about 1.5 percent of the total weight of reactants.

Depending on the use to which the substituted urethane acrylates are to be put, various materials can be added including curing catalysts, fillers, extenders, pigments and dyes.

Generally, diluent monomers are added to substituted urethane acrylates of the invention to reduce their viscosity and increase or decrease their curing rate. Amounts of the diluent monomer up to 2 or more times the weight of the substituted urethane acrylate present may be employed. A suitable diluent monomer is any ethylenically unsaturated monomer that is compatible and copolymerizable with the substituted urethane acrylates of the invention. Suitable ethylenically unsaturated monomers include acrylic acid, acrylates and acrylate esters such as methyl methacrylate, ethyl acrylate, 2-ethylhexyl acrylate, cyclohexyl acrylate, styrene and its derivatives such as, 2-chlorostyrene, 2,4-dichlorostyrene, acrylamide, acrylonitrile, t-butyl acrylate, methyl acrylate, butyl acrylate, 2-(N-butylcarbamyl)ethyl methacrylate and 2-(N-ethylcarbamyl)ethyl methacrylate, N-vinyl-2-pyrrolidinone. Especially desirable dilutent monomers are the acrylic acid and methacrylic acid esters of 1,1-dihydroperfluoroalkanols such as 2,2,2-trifluoroethyl acrylate, 1,1-dihydroperfluoropropyl methacrylate, 1,1-dihydroperfluorobutyl acrylate and 1,1-dihydroperfluorooctyl methacrylate. Other diluent monomers that can be incorporated into the composition of the invention to increase the cross-link density include 1,4-butylene dimethacrylate or acrylate, 1,1,6,6-tetrahydroperfluorohexanediol diacrylate, ethylene dimethacrylate, glyceryl diacrylate or methacrylate, glyceryl triacrylate or trimethacrylate, pentaerythritol triacrylate or trimethacrylate, diallyl phthalate, dipentaerythritol pentaacrylate, neopentylglycol triacrylate and 1,3,5-tri(2-methacryloxyethyl)-s-triazine.

Suitable catalysts or initiators for use in polymerizing (curing) the compositions of the invention are catalysts which liberate or generate free radicals upon addition of energy in the form of radiation such as heat, actinic light or electron beam. Such catalysts are well known and are described frequently in the polymerization art, e.g., Chapter II of "Photochemistry" by Calvert and Pitts, John Wiley & Sons (1966).

Included among free radical catalysts are the conventional heat activated catalysts such as organic peroxides and organic hydroperoxides; examples are benzoyl peroxide, tertiary-butyl perbenzoate, cumene hydroperoxide, azobis(isobutyronitrile) and the like. The preferred catalysts are photopolymerization initiators which facilitate polymerization when the composition is irradiated. Included among such initiators are acyloin and derivatives thereof, such as benzoin, benzoin methyl ether, benzoin ethyl ether, benzoin isopropyl ether, benzoin isobutyl ether, and α-methylbenzoin; diketones such as benzil and diacetyl, etc.; organic sulfides such as diphenyl monosulfide, diphenyl disulfide, decyl phenyl sulfide, and tetramethylthiuram monosulfide; S-acyl dithiocarbamates, such as S-benzoyl-N,N-dimethyldithiocarbamate; phenones such as acetophenone, α,α,α-tribromacetophenone, α,α-diethoxyacetophenone, o-nitro-α,α,α-tribromoacetophenone; benzophenone, and p,p'-tetramethyldiaminobenzophenone; sulfonyl halides such as p-toluenesulfonyl chloride, 1-naphthalenesulfonyl chloride, 2-naphthalenesulfonyl chloride, 1,3-benzenedisulfonyl chloride, 2,4-dinitrobenzenesulfonyl bromide and p-acetamidobenzenesulfonyl chloride. Normally, the initiator is used in amounts ranging from about 0.01 to 5% by weight of the total polymerizable composition. When the quantity is less than 0.01% by weight, the polymerization rate becomes extremely low. If the initiator is used in excess of about 5% by weight, no correspondingly improved effect can be expected. Preferably, about 0.25 to 1.0% by weight of initiator is used in the polymerizable compositions. As noted above, a catalyst is not necessary when cure of the present materials is undertaken by such curing techniques as electron beam.

The advantages and benefits of the compositions of the invention will be described in the following illustrative examples wherein the term "parts" refers to parts by weight unless otherwise indicated. In the examples, the polyetherpolyols having pendent fluorinated organic groups were prepared according to the following general procedure.

The fluorine containing alcohols were prepared in glass reaction flasks equipped with a stirrer, thermometer and a dropping funnel. A dry atmosphere was maintained within the flask during the reaction.

In each preparation, the hydroxyl-containing material (generally, about 0.1 mole) and 0.3 weight percent of a catalyst system of both bis(trifluoromethylsulfonyl) phenylmethane, $(CF_3SO_2)_2CHC_6H_5$, and dibutyldiphenyltin, $(C_6H_5)_2(C_4H_9)_2Sn$, were charged into the flask and heated to 80° C. while stirring. The fluorine containing epoxide and, where used, a copolymerizable oxacycloalkane (e.g., non-fluorine containing oxirane, oxetane or oxolane) were then charged dropwise over a period of 0.5 to 1 hour to the stirred and heated flask. The resulting mixture was stirred at atmospheric pressure at 50° C. to 125° C. until the reaction was substantially complete, generally 8 to 24 hours. Then the reacted compositions were heated at about 80° C. under about 0.5 Torr for a period of time sufficient to remove volatile components. The ratio of the moles of initiator hydroxyl compound to the moles of fluorine containing epoxide and oxacycloalkane (where used) was varied to control the hydroxyl equivalent of the product fluorine containing alcohol.

Objects and advantages of this invention are further illustrated by the following examples, but the particular materials and amounts thereof recited in these examples, as well as other conditions and details, should not be construed to unduly limit this invention.

EXAMPLES 1-21

In accordance with the general procedures given above, various fluorine containing alcohols were prepared. The initiator alcohol, fluorine containing epoxide, mole ratio of alcohol to epoxide, reaction temperature and ratio of moles of bis(trifluoromethylsulfonyl)-phenylmethane (conveniently referred to as phenyl disulfone, or φDS) to moles of dibutyldiphenyltin in the catalyst system are given in Table I. Also given are the hydroxyl equivalent weight and the values of m and n in the general formula of the product alcohol. Also given in Table I are the glass transition temperature, $T_g$, the melting point, $T_m$, and the refractive index of the product fluorine containing alcohol.

The hydroxy equivalent weights were obtained by reacting the hydroxyl group with phenylisocyanate, adding amine to remove the excess phenyl isocyanate and titrating the excess amine with dilute hydrochloric acid. The value of m was found by calculation from the hydroxyl equivalent weight. The Tg and Tm were measured using differential thermal analysis (using the 900 DTA differential thermal-analyzer and instructions available from the E.I. duPont deNemours and Company). The refractive indices were determined on a Karl Zeiss refractometer.

TABLE I

Fluorinated Organic Group-Containing Alcohols $R\{(-OCH_2CH)_{\overline{m}}OH]_n$
$\phantom{xxxxxxxxxxxxxxxxxxxxxxxxxxxxxxxxxxxxxxxxxxxxxx}|$
$\phantom{xxxxxxxxxxxxxxxxxxxxxxxxxxxxxxxxxxxxxxxxxxxxxxx}W$
$\phantom{xxxxxxxxxxxxxxxxxxxxxxxxxxxxxxxxxxxxxxxxxxxxxxx}|$
$\phantom{xxxxxxxxxxxxxxxxxxxxxxxxxxxxxxxxxxxxxxxxxxxxxxx}R_f$

| Exp. No. | Initiator Alcohol R(OH)n | —W—Rf | Initial mole ratio alcohol/epoxide | Reaction temp. (°C.) | m | n | Hydroxyl Equiv. Weight | Tg, °C. | Tm °C. | Index $n_D^{22}$ |
|---|---|---|---|---|---|---|---|---|---|---|
| 1[a] | 1,6-hexanediol | —CH$_2$OCH$_2$C$_7$F$_{15}$ | 1/2 | 80–100 | 1.0 | 3 | 524 | −62 to −55 | −17 | 1.365 |
| 2[a] | 1,6-hexanediol | " | 1/4 | 75 | 2.0 | 2 | 970 | −54 to −43 | −19 | 1.356 |
| 3[a] | 1,6-hexanediol | " | 1/5.6 | 80 | 2.6 | 2 | 1220 | −44 to −34 | −9 | — |
| 4[a] | 1,6-hexanediol | " | 1/12 | 75 | 5.3 | 2 | 2070 | −33 to −23 | +3 | 1.3517 |
| 5[a] | 1,6-hexanediol | " | 1/20 | 75 | 6.9 | 2 | 3200 | −28 to −15 | +12 | 1.3502 |
| 6[a] | 1,4-butanediol | " | 1/4 | 80 | 2.1 | 2 | 987 | −53 to −35 | −7 & −18 | 1.3549 |
| 7 | tetraethyleneglycol[b] | " | 1/3.8 | 90 | 1.6 | 2 | 847 | −51 to −43 | −6 | 1.360 |
| 8 | 1,4-cyclohexane-dimethanol[b] | " | 1/4 | CHCl$_3$ reflux | 1.4 | 2 | 717 | −51 to −42 | none | 1.264 |
| 9 | 1,4-cyclohexane- | " | 1/4 | 105–110 | 1.8 | 2 | 880 | −42 to −32 | −13 | 1.256 |

TABLE I-continued

Fluorinated Organic Group-Containing Alcohols $R[(OCH_2CH)_{\overline{m}}OH]_n$
                                                              $|$
                                                              $W$
                                                              $|$
                                                              $R_f$

| Exp. No. | Initiator Alcohol R(OH)n | —W—Rf | Initial mole ratio alcohol/ epoxide | Reaction temp. (°C.) | m | n | Hydroxyl Equiv. Weight | Tg, °C. | Tm °C. | Index $n_D^{22}$ |
|---|---|---|---|---|---|---|---|---|---|---|
| 10 | 1,1,6,6-tetra-hydroperfluoro-hexanediol[b] | " | 1/4.6 | 80 | 2.4 | 2 | 1226 | −72 to −58 | −10 | 1.347 |
| 11 | trimethylol propane[c] | " | 1/6 | 85–90 | 2.2 | 3 | 1050 | not detectable | +2 | 1.355 |
| 12 | 1,2,6-hexane-triol[c] | " | 1/6 | 80 | 1.9 | 3 | 920 | not detectable | −3 +34 | |
| 13 | 1,2,6-hexane-triol[b] | —CH$_2$—O—C$_6$F$_5$ | 1/4 | 83 | 1.6 | 2 | 451 | −45 to −40 | none | 1.465 |
| 14 | 1,2,6-hexane-triol[a] | —CH$_2$OCH$_2$(CF$_2$)$_6$H | 1/4 | 60–70 | 1.8 | 2 | 737 | −63 to −54 | none | 1.3726 |
| 15 | allylalcohol[a] | CF$_3$ | 1/30 | THF reflux | 13.0 | 1 | — | −74 to −84 | none | 1.440 |
| 16 | 1,6-hexanediol[a] | —CH$_2$OCH$_2$CF$_3$ | 1/4 | 90 | 1.6 | 2 | 309 | −66 to −58 | none | 1.406 |
| 17 | 1,6-hexanediol[d] | —CH$_2$OC(=O)—F | 1/4 | 80 | 1.8 | 2 | 736 | −22 to −14 | none | 1.381 |
| 18 | 1,6-hexanediol[b] | 1/1-CH$_2$CH$_3$/ —CH$_2$OCH$_2$C$_7$F$_{15}$ | 1/4 | 80 | 1.9 | 2 | 555 | −64 to −56 | none | 1.379 |
| 19 | Carbowax400[e][f] | —CH$_2$OCH$_2$C$_7$F$_{15}$ | 1/2 | 90 | 2.0 | 2 | 1090 | −56 to −47 | −29 | 1.372 |
| 20 | Q4-3667[e][g] | " | 1/4 | 80–90 | 1.4 | 2 | 1240 | −76 to −58 | +1 | 1.404 |
| 21 | PCP-0200[e] | " | 1/4 | 80–90 | 2.0 | 2 | 1040 | −64 to −53 −41 to −30 | +35 | 1.381 |
| 22 | DPE-PCP[h][i] | " | 1/6 | 110 | 1.3 | 6 | 796 | NA | NA[k] | NA |
| 23 | TPE-PCP[j][i] | " | 1/8 | 110 | 1.3 | 8 | 700 | NA | NA | NA |

Notes
[a] catalyst system - phenyl disulfone and diphenyl dibutyltin in 1/1 ratio
[b] catalyst system - phenyl disulfone and diphenyl dibutyltin in 1/1.5 ratio
[c] catalyst system - phenyl disulfone and diphenyl dibutyltin in 1/2 ratio
[d] catalyst system - HSbF$_5$.6H$_2$O and diphenyl dibutyltin in 1/1.1 ratio
[e] catalyst - phenyl disulfone and diphenyl dibutyltin in 1/1.1 ratio
[f] polyoxyethylene glycol, M.W. = 400
[g] diorgano polysiloxanediol
[h] condensation product of dipentaerythritol (DPE) and 8.0 moles of caprolactone per mole of DPE by heating at 165–170° C. for 21 hours
[i] catalyst system - phenyl disulfone and diphenyl dibutyl tin in 1/1.4 ratio
[j] condensation product of tripentaerythritol (TPE) and 8.0 moles of caprolactone per mole of TPE by heating at 165–170° C. for 21 hours
[k] NA — not available The following additional examples illustrate the preparation of the substituted urethane acrylates of the invention.

EXAMPLE 24

Thirty grams of the fluorine containing polyol of Example 2 was mixed with one equivalent (7.50 g) of distilled isophorone diisocyanate until thoroughly blended. The mixture was roll milled until the infrared spectrum of the mixture no longer exhibited an absorption peak at 3.10 micrometers attributable to hydroxyl functionality (about two hours). One equivalent (4.40 g) distilled 2-hydroxyethyl methacrylate was then added to the mixture and roll milling continued until the infrared spectrum no longer exhibited an absorption peak at 4.2 micrometers attributable to isocyanate functionality, but exhibited a peak at 5.84 micrometers attributable to urethane functionality (about two hours). The substituted urethane acrylate obtained was a clear, very viscous oil having a structure that was essentially:

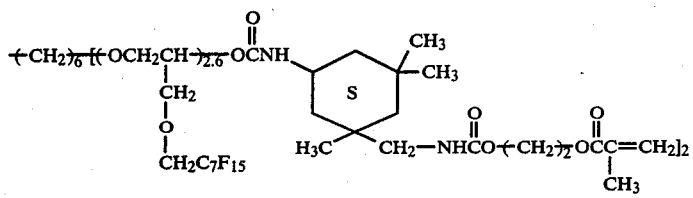

To ten parts of the substituted urethane acrylate obtained above was added and thoroughly mixed one part by weight of 1,1-dihydroperfluorooctyl methacrylate to reduce the viscosity of the mixture and 0.01 part of diethoxyacetophenone as actinic light or photoinitiator. The mixture was cast as a 140 micrometer thick layer between two sheets of 50 micrometer polyester. Upon exposure to the radiation from a xenon/mercury arc lamp, the layer cured within one minute to a tough, flexible, clear film having a refractive index of 1.402, a tensile strength of 85.4 kg/cm² (1200 psi), and an elongation at break of 9.4%.

EXAMPLES 25–27

The procedure of Example 22 was followed with the exception that different fluorine containing polyols from Table I were employed. The results of these further runs are summarized in Table II. Isophorone diisocyanate, 2-hydroxyethylmethacrylate, and diethoxyacetophenone photoinitiator were employed as in Example 22.

TABLE II

| | | | Properties of Cured Polymer | | |
|---|---|---|---|---|---|
| Ex. No. | Fluorocarbon polyol used | Diluent monomer used | Refractive index, $n_D^{22}$ | tensile strength, kg/cm² | elongation at break, % |
| 25 | Ex. 9 | 10% 1,1-dihydroxy perfluorooctyl methacrylate | 1.395 | 145 | 14.4 |
| 26 | Ex. 6 | 10% 1,1-dihydroxy perfluorooctyl methacrylate | 1.411 | 155 | 40.8 |
| 27 | Ex. 11 | 10% 1,1-dihydroxy perfluorooctyl methacrylate | 1.397 | 77 | 6.7 |

EXAMPLES 28–31

The procedure of Example 22 was followed with the exception that the preparation of the substituted urethane acrylate was accomplished by heating the reaction mixture with an infrared lamp on a roll mill. The results of these runs are summarized in Table III.

TABLE III

| | | | Properties of Cured Polymer | | |
|---|---|---|---|---|---|
| Ex. No. | Fluorocarbon polyol used | Diluent monomer used | Refractive index, $n_D^{22}$ | tensile strength, kg/cm² | Elongation at break, % |
| 28 | Ex. 14 | 10% 1,1-dihydroxy perfluorooctyl methacrylate | 1.433 | 120 | 46.8 |
| 29 | Ex. 3 | 10% 1,1-dihydroxy perfluorooctyl methacrylate | 1.398 | 41.3 | 27.6 |
| 30 | Ex. 8 | 10% 1,1-dihydroxy perfluorooctyl methacrylate | 1.431 | 145 | 28 |
| 31 | Ex. 2 | none | 1.402 | 20 | 12.8 |

EXAMPLE 32

A substituted urethane acrylate was prepared by mixing on a roller mill for about two hours a mixture of 20 parts of the fluorine containing diol of Example 2 and 3.19 parts of isocyanatoethyl methacrylate (available from Dow Chemical Company). The resulting compound had an infrared absorption peak at 5.84 micrometers attributable to urethane functionality. A cured film prepared without addition of diluent monomer had a refractive index of 1.388, a tensile strength of 60 kg/cm² (850 psi) and an elongation at break of 2%.

EXAMPLE 33

The procedure of Example 32 was followed with the exception that an equivalent amount of the fluorine containing polyol of Example 22 was used in place of the diol of Example 2. I.R. of the product indicated that the reaction was completed after one hour of mixing. The substituted urethane acrylate obtained was a clear oil. A 250 m thick layer in a 5 cm×5 cm teflon mold was exposed under nitrogen to a 2 kw mercury lamp in an exposure unit (Berkey-Ascor Co.). After 30 seconds of exposure, the layer was completely cured to a clean tack-free film.

EXAMPLE 34

The procedure of Example 33 was followed with the exception that an equivalent amount of the polyol of Example 23 was used in place of the polyol of Example 22. The substituted urethane acrylate obtained could be polymerized to a clean tack-free film by exposure to ultraviolet as described in Example 33.

EXAMPLE 35

Ten parts of the substituted urethane acrylate prepared in Example 22 was diluted with 3 parts by weight of 1,1-dihydroperfluorooctyl methacrylate and polymerized as a film that had an index of refraction of 1.408, a tensile strength of 133 kg/cm² (1900 psi) and an elongation at break of 36%.

EXAMPLE 36

When ten parts of substituted urethane acrylate prepared in Example 24 were diluted with five parts by weight of 1,1-dihydroperfluorooctyl methacrylate and polymerized, a film was obtained having an index of fraction of 1.397, a tensile strength of 78.4 kg/cm² (1120 psi) and an elongation at break of 82%.

EXAMPLE 37

The substituted urethane acrylate prepared in Example 24 was diluted with 10% by weight of the acrylate ester rather than the methacrylate ester of 1,1-dihydroperfluorooctyl alcohol and cast as a 140 micrometers thick film between two sheets of polyester film. The cured film obtained had a refractive index at 25° C. of 1.413, a tensile strength of 78.4 kg/cm² (1120 psi) and an elongation at break of 29%.

EXAMPLE 38

The procedure of Example 24 was followed with the exception that an equivalent weight of tolylene-2,4-diisocyanate was used in place of isophoronediisocyanate. The substituted urethane acrylate obtained had an infrared spectrum consistent with a structure that was essentially:

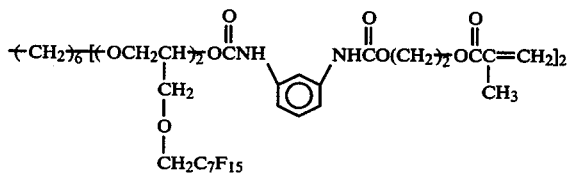

On polymerization of the urethane acrylate without use of a diluent monomer, a cured film having a refractive index at 25° C. of 1.408, a tensile strength of 65 kg/cm² (928 psi), and an elongation at break of 42% was obtained.

EXAMPLE 39

A rapidly photocuring system was formulated by mixing 4 grams of the substituted urethane acrylate as described in Example 24 with 2 grams of 1,1-dihydroxyperfluorooctylacrylate, 2 grams of 1,6-tetrahydroperfluorohexanediol diacrylate, 0.8 gram N-vinyl-2-pyrrolidinone and 0.5 gram diethoxyacetophenone. This formulation was coated onto poly(vinylchloride) film. Upon exposure in air to ultraviolet radiation of 1 joule/cm² from two 200-watt medium pressure Hanovia mercury lamps, the formulation cured in 0.5 second to form a clear tough coating.

EXAMPLE 40

A sample of the substituted urethane acrylate described in Example 24 was coated onto a sheet of 2 mil (50 micrometer) polyester film using a #14 wire-wound bar. A thin sheet of 0.5 mil polyimide was rolled over the coating with a printing roller. The sample was irradiated in an electron beam at 1.05 KV and 2.5 milliamps for 8 seconds. The coating was completely cured after this exposure.

EXAMPLE 41

A 1-gram sample of the substituted urethane acrylate described in Example 24 was mixed with 25 mg AIBN (azobisisobutyronitrile) with gentle heating until the initiator was dissolved. A 5.4-mil (140 micrometer) coating was cast between two layers of 2-mil (50 micrometer) polyester. The sample was cured at 65° C. for 15 hours, after which time the sample was cured.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A radiation curable urethane acrylate or methacrylate compound having an aliphatic backbone, said backbone having at least one ether or polyether group with at least one pendent fluorinated organic group attached thereto, said urethane acrylate or methacrylate having the formula:

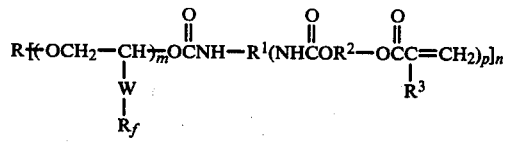

wherein

R is a monomeric or polymeric organic radical having a valence of n selected from (a) a monomeric aliphatic radical having 1 to 18 carbon atoms, (b) a polymeric aliphatic radical having an equivalent weight of less than 1000 for each valence, (c) cyclohexyl, (d) 1,4-cyclohexanediyl, or (e) 1,4-cyclohexanedimethyl;

n is an integer from 1 to 6;

W is a connecting group selected from a single bond, —CH₂—O—CH₂—, and

R¹ is an organic radical selected from the group consisting of aliphatic, cycloaliphatic and aromatic radicals;

R² is a divalent aliphatic group having 2 to 6 carbon atoms;

R³ is hydrogen or methyl;

m is a number having a value from 1 to 20;

p is one or two; and

R_f is a monovalent fluorinated organic radical having 1 to 18 carbon atoms and 35 to 85 weight percent of fluorine.

2. The compound according to claim 1 wherein said pendent organic group is perfluorinated.

3. The compound according to claim 1 wherein R is derived from alcohols having 1 to 18 carbon atoms and 1 to 6 hydroxyl groups.

4. The compound according to claim 1 wherein R¹ is derived from isophorone diisocyanate or toluene diisocyanate.

5. The compound according to claim 1 wherein R_f is selected from the group consisting of fluorinated alkyl and alkoxyalkyl.

6. The compound according to claim 5 wherein said fluorinated alkyl group is a perfluoroalkyl group having a formula $C_nF_{2n+1}$, wherein n has a value of 1 to 12.

7. The compound according to claim 1 wherein the —W—R_f group of said formula is a —CH₂OCH₂C₇F₁₅,

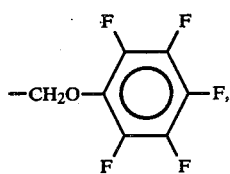

—CH$_2$OCH$_2$(CF$_2$)$_6$H, —CF$_3$,

or —CH$_2$OCH$_2$CF$_3$ group.

8. A radiation curable urethane acrylate or methacrylate compound having an aliphatic backbone, said backbone having at least one ether or polyether group with at least one pendent fluorinated organic group attached thereto, said urethane acrylate or methacrylate having the formula:

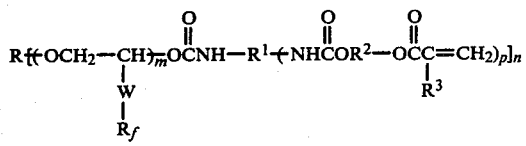

wherein

R is a monomeric or polymeric organic radical having a valence of n derived from alcohol selected from the group consisting of ethyleneglycol, 1,6-hexanediol, 1,4-butanediol, tetraethyleneglycol, 1,4-cyclohexanedimethanol, 1,4-cyclohexanediol, 1,1,6,6-tetrahydroperfluorohexanediol, trimethylolpropane, 1,2,6-hexanetriol, allylalcohol, pentaerythritol, sorbitol, polyoxyethylene glycol having a molecular weight of less than 2000, and diorgano polysiloxanediol having the formula:

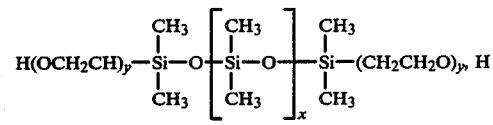

wherein
y+y'=26 x=10 n is an integer 1, 2, 3, 4, or 6;
W is a connecting group selected from a single bond, —CH$_2$—O—CH$_2$—, and

R$^1$ is an organic radical selected from aliphatic, cycloaliphatic, or aromatic radicals;
R$^2$ is a divalent aliphatic group having 2 to 6 carbon atoms;
R$^3$ is hydrogen or methyl;
m is a number having a value from 1 to 20;
p is one or two; and
R$_f$ is a monovalent fluorinated organic radical having 1 to 18 carbon atoms and 35 to 85 weight percent of fluorine.

9. The compound according to claim 8 wherein said pendant organic group is perfluorinated.

10. The compound according to claim 8 wherein R$_f$ is selected from the group consisting of fluorinated alkyl and alkoxyalkyl.

11. The compound according to claim 10 wherein said fluorinated alkyl group is a perfluoroalkyl group having a formula, C$_n$F$_{2n+}$, wherein n has a value of 1 to 12.

12. The compound according to claim 8 wherein the —W—R$_f$ group of said formula is a —CH$_2$OCH$_2$C$_7$F$_{15}$,

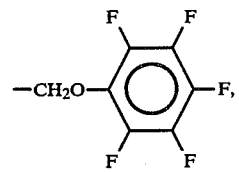

—CH$_2$OCH$_2$(CF$_2$)$_6$H, CF$_3$, —CH$_2$OCH$_2$CF$_3$, or

group.

13. The compound according to claim 8 wherein R$^1$ is derived from isophorone diisocyanate or toluene diisocyanate.

* * * * *